United States Patent
Browning, Jr.

Patent Number: 5,932,112
Date of Patent: Aug. 3, 1999

[54] METHOD AND APPARATUS FOR KILLING MICROORGANISMS IN SHIP BALLAST WATER

[75] Inventor: Wilson J. Browning, Jr., Norfolk, Va.

[73] Assignee: Browning Transport Management, Inc., Norfolk, Va.

[21] Appl. No.: 08/921,336

[22] Filed: Aug. 29, 1997

Related U.S. Application Data

[60] Provisional application No. 60/031,605, Nov. 27, 1996.

[51] Int. Cl.$^6$ .................................................. C02F 1/20
[52] U.S. Cl. ..................... 210/750; 210/764; 210/205; 210/258; 210/259
[58] Field of Search ................................ 210/205, 258, 210/259, 750, 757, 758, 764

[56] References Cited

U.S. PATENT DOCUMENTS

| | | |
|---|---|---|
| 3,251,357 | 5/1966 | Williamson . |
| 3,676,983 | 7/1972 | Nold . |
| 4,316,725 | 2/1982 | Hovind et al. . |
| 5,180,403 | 1/1993 | Kogure . |
| 5,192,451 | 3/1993 | Gill . |
| 5,376,282 | 12/1994 | Chang . |
| 5,578,116 | 11/1996 | Chang . |

FOREIGN PATENT DOCUMENTS 4322788  11/1992  Japan .

OTHER PUBLICATIONS

Public Announcement: "Ship Ballast Water Could Be Treated to Prevent Release of Non–native Organisms" National Reseach Council, Jul. 3, 1996.

*Primary Examiner*—Jay H. Woo
*Assistant Examiner*—Betsey J. Morrison
*Attorney, Agent, or Firm*—Sughrue, Mion, Zinn, Macpeak & Seas, PLLC

[57] ABSTRACT

A method and apparatus for treating ship ballast water before it is discharged into coastal waters. The ballast water may contain harmful non-indigenous microorganisms. Before discharge, the ballast water is oxygenated and deoxygenated to reduce the populations of anaerobic and aerobic microorganisms, respectively. If anaerobic microorganisms are of no concern, the oxygenation step can be eliminated.

28 Claims, 6 Drawing Sheets

METHOD AND APPARATUS FOR KILLING MICROORGANISMS IN SHIP BALLAST WATER

I claim the benefit under 35 U.S.C. §119(e) of priority from my Provisional Application Ser. No. 60/031,605, filed Nov. 27, 1996.

BACKGROUND OF THE INVENTION

1. Field of the Invention

My invention relates generally to the field of treating ship ballast water containing potentially undesirable organisms, and more particularly to a method and apparatus for treating ship ballast water to kill potentially undesirable aerobic and/or anaerobic microorganisms in the water to prevent them from being transported from one coastal area to another.

2. Basic Conditions and Vocabulary

Oceangoing ships may transport various organisms contained in their ballast water from any port in the world to any other port in the world. Macroorganisms can be filtered out, and the remaining microorganisms can be of extremely diverse natures due to their diverse origins. The term colony forming unit (CFU) is often used to describe any microorganism that reproduces. Thus, unless otherwise modified, the terms, CFU and microorganism, shall have the same meaning. Levels of dissolved oxygen in a ship's ballast water play a part in my invention, and the abbreviation, DO, will be used to connote such dissolved oxygen.

3. Description of the Prior Art

When a ship unloads cargo in a foreign port, the resulting empty holds of the ship are often filled with the local water as ballast to stabilize the ship. When arriving at a U.S. port or other loading port to take on replacement cargo, the ship typically discharges the prior local, that has now become foreign, ballast water into coastal waters in or near the U.S. (or other) port, thereby introducing nonindigenous organisms, including aerobic and anaerobic microorganisms, which may have a deleterious (or at least an unknown) effect on the ecosystem of the receiving coastal waters.

One current proposal for attempting to cure this problem is to require ships to exchange, in mid-ocean or on the high seas, the original local ballast water with the saline, open ocean sea water; however, such an exchange of ballast water on the high seas is potentially extremely hazardous, especially, for large cargo ships and tankers, and in any event has been shown not to be fully effective in removing all microorganisms from a ship's holds.

This mid-ocean ballast exchange is usually (but not always) safe when the space in which the water is being exchanged is small enough so as not to create a dangerous instability or structural stress condition during the water-pumping process for effecting the exchange; for example, such a ballast exchange usually (but not always) is safe when dealing with specialized ballast tanks or other similar small spaces because of the low ratio of the weight of the involved water with the overall weight of the ship, and because of the ability of the load bearing strength of the ship to accommodate a temporarily empty "small" specialized ballast tank.

However, it is often required that cargo holds or large ballast tanks be filled with water so that the ship's center of gravity is lowered during a voyage when no cargo is carried. Under these conditions, one or more cargo holds or tanks are often filled with ballast water. Because these holds or tanks contain very large spaces, they must be kept either completely full or completely empty so that interior wave action does not develop. Thus, if ballast exchange were attempted from such a large space and the ship encountered heavy seas in the middle of the pumping process, then there could develop inside the space a wave action which could destabilize the ship and create a very dangerous condition. Capsizes and loss of life have been attributed to vessels encountering unexpected sea conditions during ballast exchange. Unless done with perfect skill in keeping the hull of a vessel in proper trim and balance, ballast exchange will also exert internal structural stress on the vessel, even in good weather, so as to damage the structure in such a way that a traumatic structural failure can occur either immediately or over time. Such stress is of the nature of bending the steel wire of a paper clip back and forth until it breaks.

That the problem of purging ship ballast water of nonindigenous microorganisms is a long standing one which has not been satisfactorily solved is well documented. For example, see: The Introduction of Nonindigenous Species to the Chesapeake Bay via Ballast Water, Chesapeake Bay Commission, Jan. 5, 1995; BIMCO Weekly News, No. 8, Feb. 19, 1997, The Baltic and International Maritime Counsel; "Push for Rules on Ballast Exchange Gains Support", the Journal of Commerce, Mar. 26, 1996; "Stemming the Tide of Change", The Journal of Commerce, Jun. 24, 1996; "Ballast Rule Ineffective for Pest Control in Lakes", The Journal of Commerce, Jun. 24, 1996; and "Governors Offer Grant to Fight Great Lakes Invaders", The Journal of Commerce, Jul. 26, 1996. Furthermore, the U.S. Congress recently passed the "National Invasive Species Act of 1996" (P.L. 104-332) which requires the U.S. Coast Guard to issue voluntary national ballast water guidelines within a year.

U.S. Pat. No. 5,192,451 discloses a method of controlling the growth of zebra mussels in ship ballast water by adding a polymer to the ballast water; however, the use of chemicals to treat ballast water, which has been discharged into U.S. coastal waters, may have an adverse environmental effect on the ecosystem. U.S. Pat. Nos. 5,376,282 and 5,578,116 disclose the use of a vacuum and agitation for reducing the dissolved oxygen of natural source water specifically to a level below that sufficient to support the survival respiration of zebra mussels; however, there is no disclosure of treating ship ballast water to oxygenate and then deoxygenate the water in a process which encompasses the general worldwide problem of the transfer from any one to any other coastal zone of microorganisms in the ballast water of a ship. U.S. Pat. No. 3,676,983 discloses an apparatus including a vacuum chamber and an agitator for removing gases from a liquid; however, there is no recognition of the problem of nonindigenous microorganism treatment in ship ballast water, and the removal of dissolved oxygen in the water to a level where aerobic microorganisms are killed. U.S. Pat. No. 4,316,725 discloses several methods, including the use of a vacuum, to remove dissolved oxygen from water. U.S. Pat. No. 3,251,357 discloses injecting combustion/stack gases into water for treating the water to inhibit the growth of, e.g., microorganisms; however, there is no recognition of, or suggested solution for, the long felt problem of how to remove anaerobic or aerobic microorganisms from ship ballast water.

SUMMARY OF THE INVENTION

Thus, the primary and broad object of my invention is to provide a method and apparatus by which ship ballast water is treated in a cost-effective and time-effective manner to kill nearly all of the nonindigenous aerobic and/or anaerobic microorganisms in ship ballast water.

Another object of my invention is to provide such a method and apparatus which efficiently and inexpensively reduce the level of dissolved oxygen in ship ballast water to a point where substantially all of the aerobic microorganisms are killed, so that the treated ballast water can safely be discharged into coastal waters even when it originated in an ecologically different coastal zone. My improved method and apparatus employ controlled levels of agitation, vacuum and available suffocation times to assure that the ballast water is substantially free of nonindigenous species (up to 99% free, from lab tests).

Another object of the invention is further to treat the ballast water by passing through the ballast water combustion/stack gases (or a gas from another source) that contain carbon monoxide (and other reducing gases) which, by chemical reaction, removes additional dissolved oxygen (DO) from the ballast water. This step of the process may be supplemental to the treatment process in some cases or integral in others. Such gases assist the success of the removal of nonindigenous species. This is so because the agitation/vacuum process step removes most of the (DO) from the ballast water, and continuous cycling of the ballast water through the agitation/vacuum process should reduce the DO asymptotically close to zero. The combustion/stack gases, however, will combine with the DO to form carbon dioxide, and thus will even more rapidly reduce the DO. Faster DO reduction times will lead to shorter required suffocation times, and the use of the reducing (combustion) gases could be essential to reach an acceptably low level of nonindigenous species when ballast voyages are short.

Still another object is to kill anaerobic microorganisms by hyper-oxygenating the ballast water before it is deoxygenated.

Another object of the invention is to provide a method and apparatus which so treats sea water to kill microorganisms therein, both simultaneously with its being pumped on board into a hold or tank of a ship as ballast water, and/or by cycling it from the hold or tank, to the treatment tank(s), and then back into the hold. The volume of the cycled water treated is treated within a short enough time period to leave sufficient suffocation time during the remainder of the ship's voyage to produce an acceptably low level of microorganisms by the time the vessel arrives at her next loading port where the ballast water is pumped back overboard. Each batch of water treated would be small enough to preserve the stability of the ship and to cause no significant stress of the ship's structure. Continuous cycling during the suffocation time will make the treatment even more effective.

My method and apparatus for treating ballast water to kill microorganisms therein are uniquely suitable for use on ocean going vessels where hours and days are available for carrying out the treatment.

The apparatus may be installed on land or on board a ship, or in its portable form carried on board a ship and assembled there, using pre-existing pumps and/or piping on the ship.

DESCRIPTION OF PREFERRED EMBODIMENTS

Figure 1:
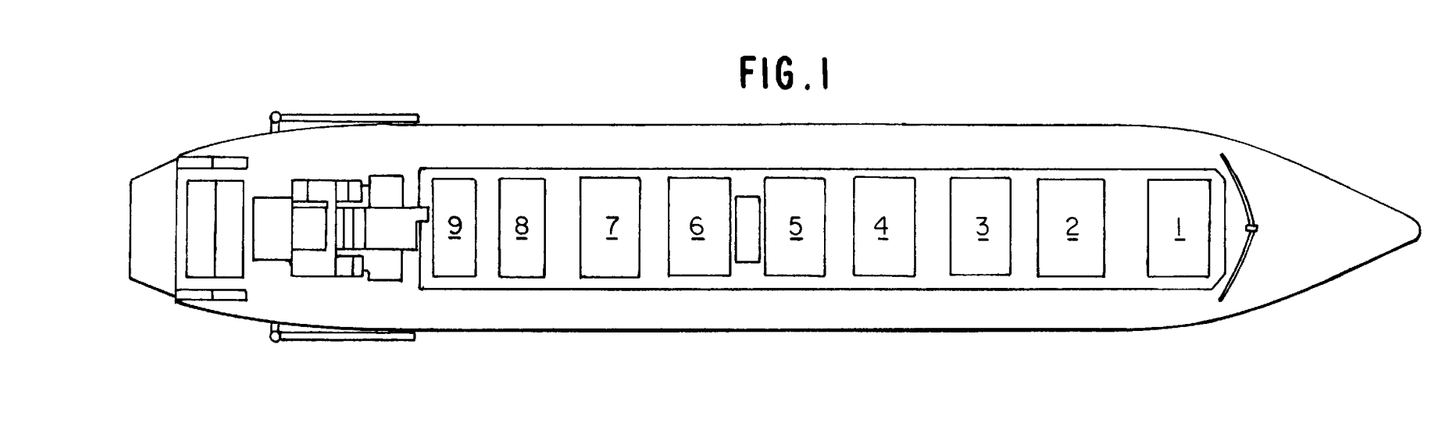
FIG. 1 is a diagrammatic plan view of an actual ship to which my invention would be applied.
Figure 2:
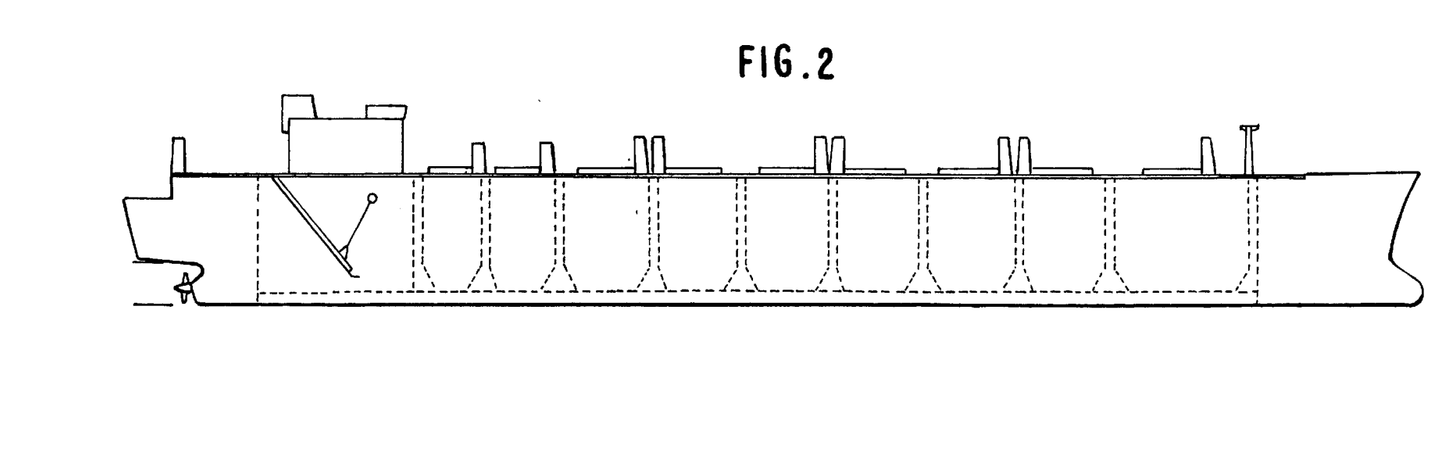
FIG. 2 is a side view of the ship illustrated in FIG. 1.

Illustrated in FIGS. 1 and 2 is a diagrammatic representation of an actual ship, the S/S Coastal Golden, a typical vessel, in many aspects, on which my invention would be used to treat ballast water stored in her holds. The smallest cargo hold is about 380,000 cubic feet, and her largest cargo hold is about 680,000 cubic feet. All of her cargo holds are large enough to destabilize the vessel if wave action developed inside the hold, except when the hold is almost empty or almost full. Such a vessel is capable of carrying both oil and dry cargo. The cargo holds are numbered from 1–9, counting forward to aft. This vessel is also typical in that it would need to carry water ballast in one or more of her holds in order to safely transit open-ocean voyages without cargo.

Figures 3, 4:
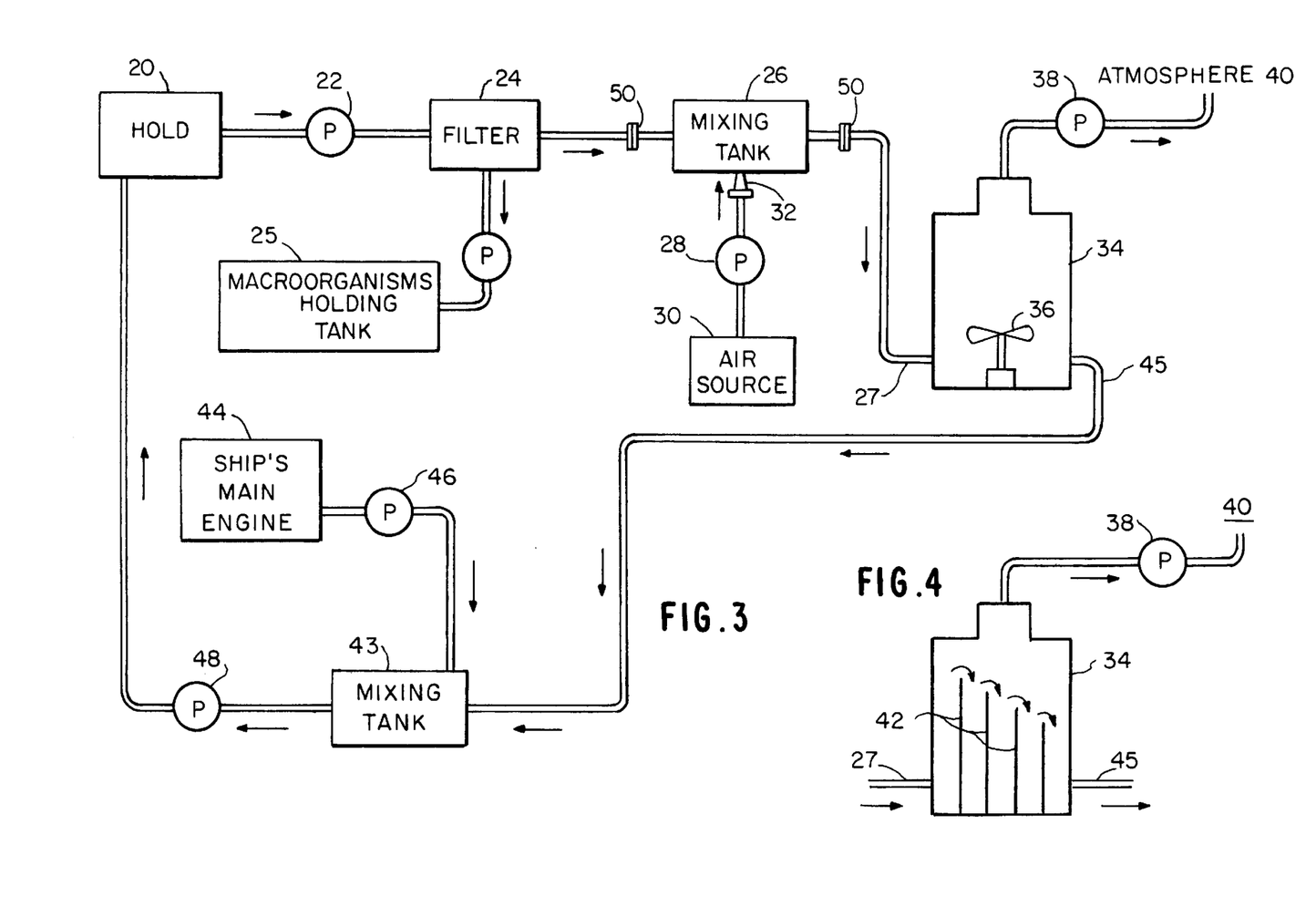
FIG. 3 is a schematic block diagram of one embodiment of the apparatus and method of my invention.
FIG. 4 is a schematic diagram of an alternative agitator for use in the embodiment of FIG. 3.

FIG. 3 is a flow diagram which illustrates preferred embodiments of both my inventive method and apparatus. Ballast water containing at least aerobic microorganisms is pumped by a pump 22 from a hold 20 through a filter system 24 (for removing macroorganisms) which are pumped into a holding tank 25 until final disposal into a mixing tank 26 in which air is mixed at pressures higher than atmospheric with the water flow by means of an air compressor pump 28 which provides air from an air source 30 through an air injector 32. From the mixing tank 26, the oxygenated ballast water flow is further pumped into a vacuum chamber 34 where it is agitated for a suitable period by means of an internal agitator 36. The vacuum chamber 34 has sufficient space above the water level therein so that dissolved oxygen (DO) liberated from the water is released into this space from which it is easily removed by a vacuum pump 38 and then discharged to the atmosphere 40. The vacuum pump maintains a vacuum over the water within the chamber. ("Vacuum" is herein used to mean a pressure less than atmospheric pressure but greater than zero pressure.) The agitator 36 may be replaced by a Weir-type system 42 (FIG. 4) in which a series of vertical plates are placed in such a manner that they form a line of plates that are ever decreasingly shorter from the in-flow 27 to the out-flow 45 of the chamber 34; such a system creates a series of waterfalls which agitate the water sufficiently to release the dissolved oxygen into the vacuum that is maintained in the chamber. Any agitation system that liberates the DO for removal by the vacuum pump is acceptable.

After the removal of the DO from the ballast water by the agitation/vacuum process, augmented as required by the injection of reducing combustion gases ($2CO+O_2=2CO_2$), the ballast water is pumped into the ship's hold or into a tank where it is intended to reside and which has been rendered "weathertight" or airtight (and/or maintained oxygen inert by the injection, into any space that $O_2$ could flow into, of combustion or other inert gases). The lack of sufficient DO in the ballast water will then kill any resident aerobic microorganisms over a time period depending on the stamina of each microorganism relative to a lack of sufficient DO for respiration. A typical transatlantic ballast voyage would take 10 to 15 days. My lab tests showed a 99% death rate of aerobic microorganisms in a laboratory test designed to be a proxy for a ballast voyage of 10 days in which the agitation/vacuum treatment cycle is conducted for 2 days, thereby making available an 8-day suffocation period. Calculations determined that about a two minute treatment period was required, per 10,000 gallon bath of water, to treat a 10,000-ton hold full of ballast water in two days. Thus, such a two minute treatment period under very low vacuum conditions, with no cycling during the suffocation period, and with no addition of reducing gases, was chosen for the testing. The process can be adjusted by changing pressures and treatment times, and by use of scrubbing gases, to accommodate the various microorganisms, found throughout the world, as well as the available suffocation time allowed by the intended ballast voyage.

Thus, I have accomplished the ecological goal of substantial sterilization of the ballast water without removing enough ballast water at any given time to create an unstable condition of the ship. Tests show that the ballast water in the vacuum chamber 34 need be agitated for only approximately 2 minutes, whereby only about 0.033% of a typical hold's volume would be moving through the closed loop illustrated in FIG. 3.

If desired, the deoxygenated water from the vacuum chamber 34 is fed to another mixing tank 43 where combustion exhaust gases (containing carbon monoxide), constituted by the stack gases from the ship's main engine 44, are pumped by another pump 46 into the mixing tank 43 from which the water is pumped by a pump 48 and returned in a closed loop to the ballast hold 20 to complete the treatment cycle. The cycle can be repeated as many times as necessary to remove from the ballast hold sufficient dissolved oxygen to kill the desired amount (up to 99%) of the aerobic microorganisms in the ballast water.

Figure 5:
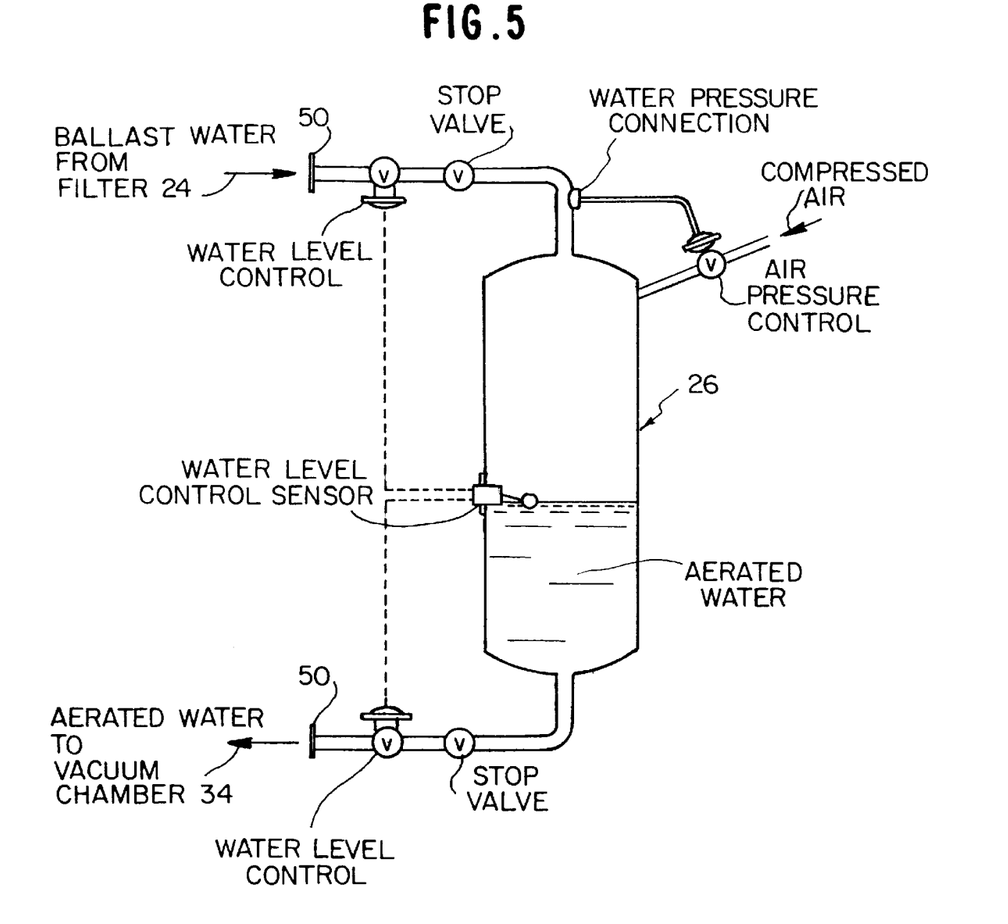
FIG. 5 is a schematic diagram of an aerator suitable for use in my invention.
Figure 5A:
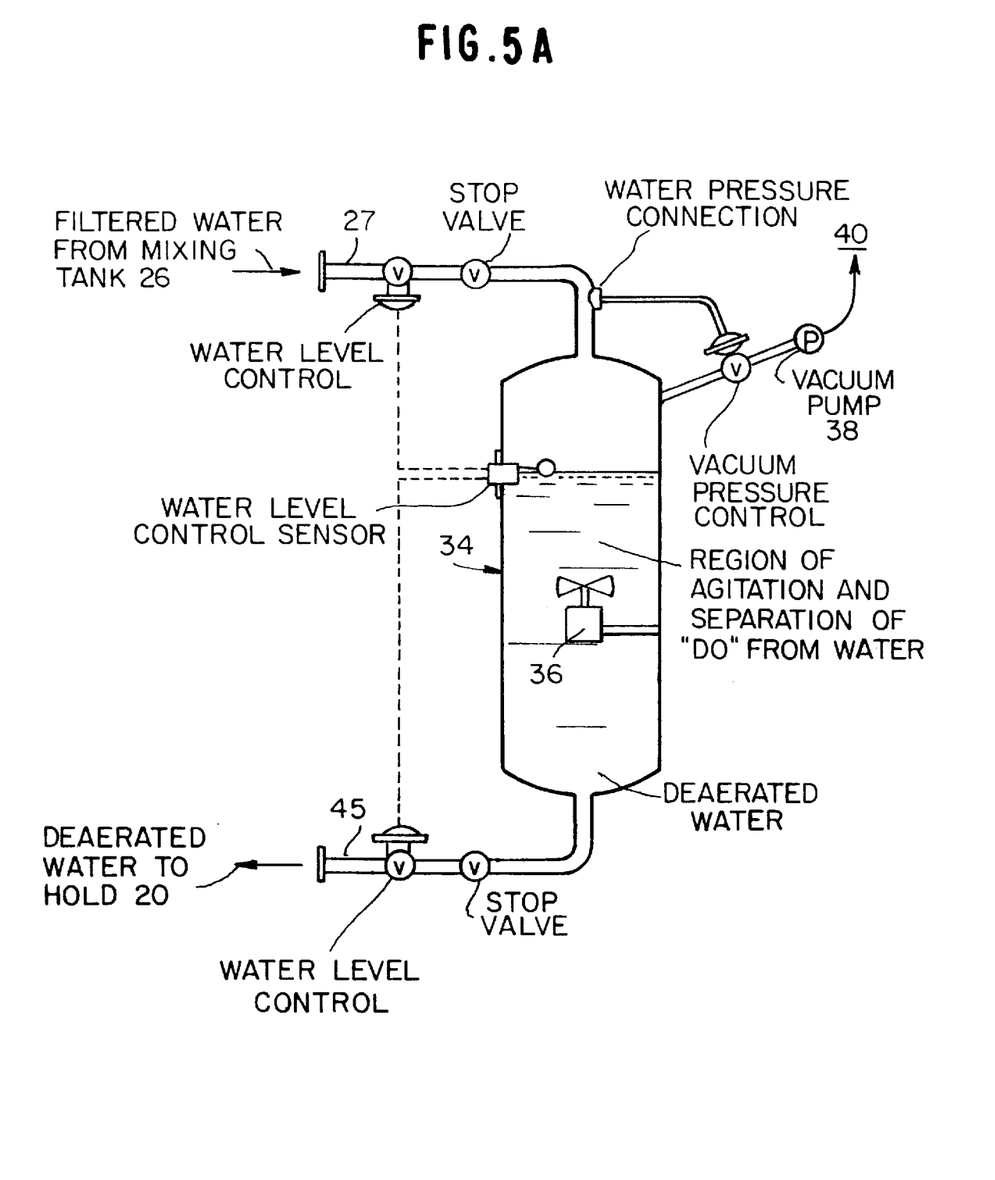
FIG. 5A is a schematic diagram of a vacuum deoxygenating chamber suitable for use in my invention.

The injected air (oxygen) in the mixing tank 26 will kill anaerobic microorganisms by hyper-oxygenation, or debilitate them into a lower level of reproduction, and the removal of dissolved oxygen in the chamber 34 kills aerobic microorganisms (while the anaerobics remain in a debilitated state). If desired, the mixing tank 26 may be disconnected from the system by means of suitable couplings 50, whereby only aerobics would be treated, in most cases anaerobic microorganisms are not primary concerns. FIG. 5 illustrates a preferred form of the mixing, oxygenator tank 26, and FIG. 5A illustrates a preferred form of the vacuum, deoxygenating chamber 34.

Figure 6:
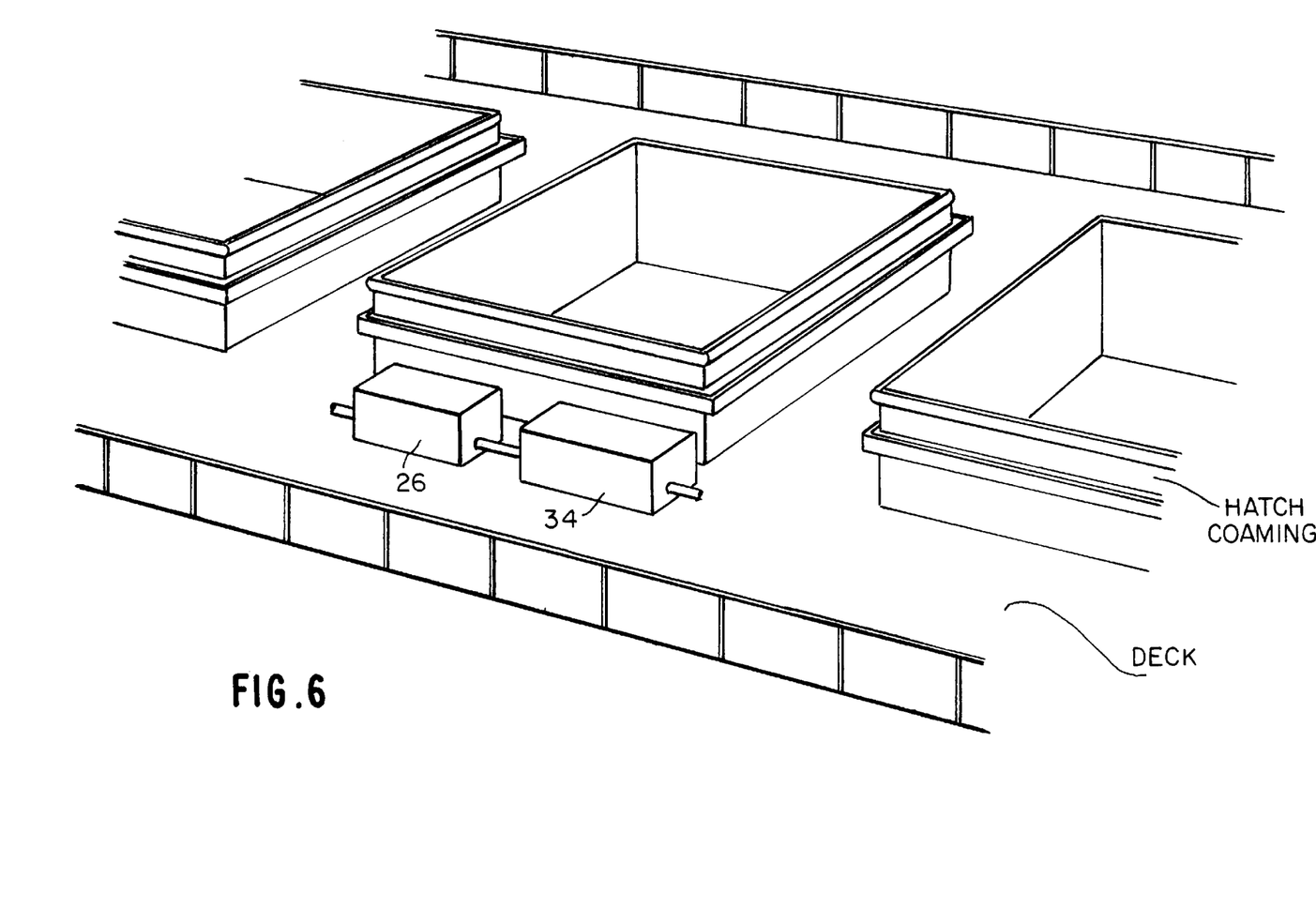
FIG. 6 is a schematic diagram illustrating a preferred location of the treatment tanks on the deck of a ship.
Figure 7:
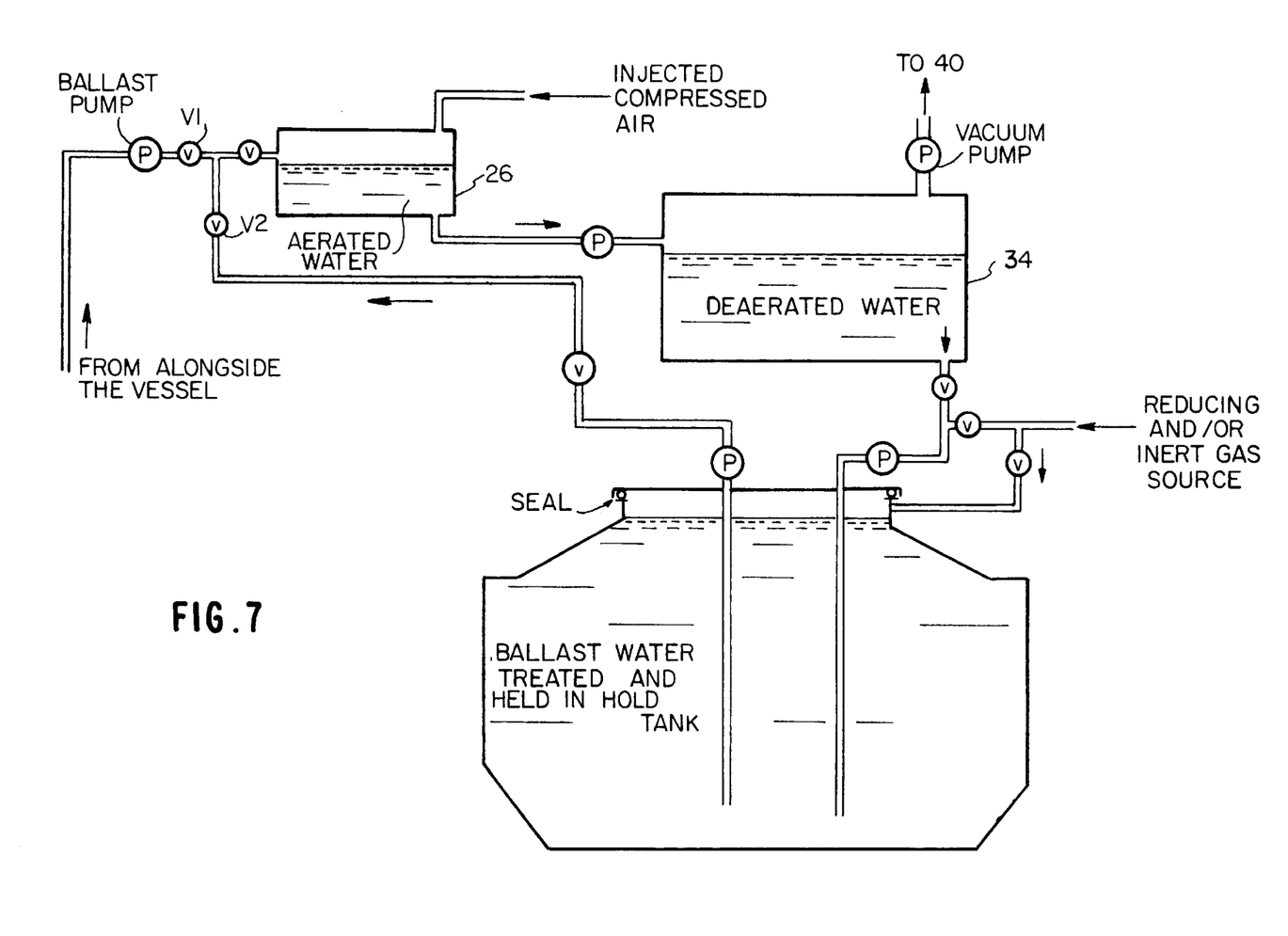
FIG. 7 is similar to FIG. 3, and illustrates a different embodiment of my method and apparatus for treating ballast water.

FIG. 6 illustrates the application of my invention to the hold(s) and coaming(s) of an actual ship, and FIG. 7 is similar to FIG. 3 and is a schematic diagram illustrating the manner in which my invention can treat incoming ballast water sourced either from the ambient water in which the ship is floating or from ballast water drawn from the hold of the ship; valves V1 and V2 are selectively opened and closed to achieve the two modes of operation.

The first study of my process was performed by having an associate take two samples of water from the Elizabeth River and deliver them immediately to Solutions Lab (now defunct). Solutions Lab conducted a procedure that closely simulated my treatment process in a test, as previously described. The results of this test were very encouraging. However, since the sampling and activities of Solutions Lab were directly under my control (and since Solutions Labs was a local lab doing excellent professional work, but with little name recognition) I submitted my process to the scrutiny of the Applied Marine Research Laboratory of Old Dominion University (AMRL/ODU) in order to establish the bona fides of the Solutions Lab study. The procedures and results of the Solutions Lab's activities are discussed during the following description of the AMRL/ODU tests, since agreement between the two tests was substantial and procedures varied only slightly.

AMRL/ODU performed a study to determine the effectiveness of my process for reducing the bacterial count in ballast water. In the AMRL/ODU procedure, an ambient water sample collected from the Elizabeth River in Virginia was used as a surrogate test medium for the study. The process parameters were evaluated under laboratory conditions, agitated and exposed to three increasingly higher vacuum levels for two minutes each.

Benchtop-scale microcosms containing the ambient river water was exposed to the three treatments and then held for 0, 2 and 8 days of $O_2$-starvation periods prior to inoculation of bacterial plates. The treatment levels were maintained at constant conditions for the exposure period. Duplicate samples of the ambient river water were sacrificed at Day-0, Day-2 and Day-8 and used to inoculate bacterial culture plates. The incubation period of 5 days was determined by the time required for the appearance of sufficient densities of bacterial colony forming units (CFUs) to allow for realistic and representative counts to be scored over a wide range of possible responses.

Effectiveness of the treatments was expressed as the differences between the initial conditions at Day-0 and the conditions at 2 and 8 days of exposure to the three treatments. The results of this study have also been compared to my initial study of this process. Because of the limited number of plates (as duplicates) for each treatment and control, a statistical level of significance could not be determined between the treatments and controls or the initial conditions.

This AMRL/ODU study actually attempted to determine the effectiveness of only the portion of my process that was considered to be of sufficient need of experimental proof within the entirety of what is ultimately contemplated in the description of all of the elements of the invention. The process is designed to reduce the bacterial level in large quantities of coastal seawater at a low cost, using "off the shelf" equipment in a precise configuration to be effective. Such water contains both aerobic and anaerobic bacteria. Under conditions where oxygen is present, aerobic bacteria will be the extremely dominant type. Some anaerobic bacteria could be present, however, and could have the capacity for adapting and flourishing, during the suffocation period, in the created environment which contains low to very low levels of oxygen. Thus, my process contains a provision to minimize such flourishing by killing or debilitating such anaerobics. The low probability of an anaerobic Nourishment and the inherent difficulty of measuring low populations of anaerobics prevented any quantitative analysis of the control of the anaerobic population by pressurized air injection which should kill or debilitate them.

The AMRL/ODU study created three environments of reduced dissolved oxygen under certain conditions for two periods of time. The results were deemed unexpected (in a positive way) and demonstrated a higher degree of effectiveness in the reduction of aerobic bacteria from the Elizabeth River than expected by both the Director and the Assistant Director of AMRL/ODU, each of whom are experts in the field.

MATERIALS AND METHODS

Work Plan for the AMRL/ODU Study

This study was designed to evaluate the earlier Solutions Lab "proof of principle" study and to determine the effectiveness of my novel water treatment process described herein. In this study, a more stringent approach to estimating the efficacy of the process was applied. Because the AMRL/ODU test was performed on an unprotected proprietary process, the three treatments are identified in a report as treatments TA, TB, and TC in increasing strengths of vacuum, namely, 2, 4, and 6 inches of Hg, as in the earlier test.

A sample of Elizabeth River was drawn just prior to the beginning of the study. One portion of the sample was set aside as an untreated, unfiltered control (CUF). The remaining sample material was filtered using an 8-micron filter. A second control was taken from the filtered sample and set-aside as a filter control (CF). The remaining filtered sample material was split into 3 aliquots for use as treatments TA, TB and TC as shown in the following TABLES 1, 2 and 3.

The three treatments (agitation by swirling and then the application of 2, 4 and 6 inch (HG) vacuums for two minutes) were performed on the three aliquots. The controls were not agitated, nor were they subjected to a vacuum. All flasks were sealed and left standing under laboratory conditions. The Day 0 samples were held for approximately 1 hour before being used to inoculate plates for bacterial colony forming units (CFU) counts.

All treatments and controls were prepared in duplicate and in sufficient numbers to provide for a sacrificial series. That is, for each treatment or control, 2 flasks were prepared for inoculations at the beginning of the study (Day 0), 2 flasks for inoculation at the end of two days (Day 2), and 2 flasks for inoculation at the end of 8 days (Day 8). Duplicate flasks were prepared for each of the treatments and controls at Day 0 and the results used to evaluate the immediate effect of the treatment as well as to establish the initial conditions.

For each duplicate treatment and control, a serial dilution of each of 4 dilution ranges was used to inoculate the bacterial plates. The bacterial CFU counts were based upon the grand mean of the two plates in the dilution range which provides the more realistic counts.

Collection and Filtration of Elizabeth River Water

The water was collected from the end of the wharf at NAUTICUS in downtown Norfolk, Va. It was collected on Jan. 14, 1997 at approximately 2:30 PM. A bucket with a rope attached was lowered into the water to collect the sample. The sample collection bucket was scrubbed with a large bottle brush and dilute Liquinox® soap. It was thoroughly rinsed with tap water, then rinsed 9 times with fresh ultrapure water. Before sampling it was rinsed 3 times with the unfiltered Elizabeth River water. This water was poured into a 20 liter carboy, which was wrapped in aluminum foil to protect the sample from direct sunlight.

The carboys were scrubbed with a large bottle brush and dilute Liquinox® soap. They were rinsed with tap water, then rinsed 2 times with 4N HCl, then 9 times with fresh ultrapure water. Before adding the filtered or unfiltered Elizabeth River water, they were rinsed 3 times with the Elizabeth River water they could contain. Approximately 19 liters of sea water were collected, allowing for approximately 1 liter of headspace in the carboy. The whole water sample was immediately transported to the Water Quality Laboratory at NAUTICUS.

In the laboratory, the overhead lights were turned off so that only emergency lights were on during filtration. Eight micron Whitman® 40 ashless filter paper was used to filter the seawater.

The scissors were scrubbed with a brush and dilute Liquinox® soap. They were rinsed with tap water, rinsed 9 times with fresh ultrapure water, and then rinsed 3 times with the unfiltered Elizabeth River water.

The Elizabeth River water in the 20 liter carboy was mixed by inversion, and then approximately 3 liters was poured into a 5 liter carboy wrapped in aluminum foil. Some of the water in the 5 liter carboy was used to rinse the labware which needed to be rinsed with unfiltered seawater (scissors, the filtration towards and the graduated cylinders). Subsamples of the unfiltered seawater from the 20 liter carboy were poured into graduated cylinders for filtration. The filtration towers, graduated cylinders and flasks were scrubbed with a large bottle brush and dilute Liquinox® soap. All items were thoroughly rinsed with tap water, then rinsed 2 times with 4N HCl, and then 9 times with fresh ultrapure water. The filtration towers and graduated cylinders were rinsed 3 times with the unfiltered seawater, and the filtration flasks were rinsed 3 times with the filtered seawater.

The Elizabeth River water was filtered into 2 liter glass vacuum filtration flasks, with a vacuum pressure of $\leq 15$ inches Hg. Approximately 10 liters of filtered seawater was placed on a 20 liter carboy which was wrapped in aluminum foil. The filtration was completed between 3 and 4:30 PM on Jan. 14, 1997. The Elizabeth River water samples were then transported to the Applied Marine Research Laboratory from the Water Quality Laboratory at NAUTICUS.

The AMRL Aquatic Toxicology laboratory received the filtered and unfiltered Elizabeth River water samples and held them at laboratory temperature (19–21° C.) while protecting them from direct exposure to ambient light. Five treatments were prepared: Unfiltered Control (CUF); Filtered Control (CF); and Filtered Treatments A (TA), B (TB), and C (TC). The 260 mL Erlenmeyer flasks with either cotton plugs or rubber stoppers used as microcosm vessels in this study were autoclaved prior to test initiation. The flasks were then filled with 200 mL of the appropriate fraction of Elizabeth River water, filtered or unfiltered. Both control treatments were stoppered with sterile cotton, and allowed to stay at equilibrium with ambient air pressure. Treatment flasks were fitted with one-hole rubber stoppers penetrated by a glass tube connected to Tygon tubing fitted with a hose clamp.

The three levels of treatment (i.e., two minutes of agitation with respective vacuum levels of 2, 4 and 6 inches of Hg) were applied to the microcosms (250 mL flasks) containing Elizabeth River water, and the flasks were sealed from the ambient air. Initiation time for each replicate was recorded, and was defined as the time at which the replicate attained the appropriate treatment level. All control and treatment flasks were kept in a dark chamber for the duration of the treatment intervals. Duplicates of the appropriate samples were provided to the bacteriologist in a time-series fashion; 1 hour following initialization, after 2-days and 8-days of exposure to the treatment.

Microcosms and Plate Counts

Microcosms were sampled within 1 hour of their transfer to the bacteriology laboratory. There, a 3-fold decimal dilution series was prepared using a 1 mL sample from each microcosm and sterile NaCl solution (15 psu). Subsamples (100 $\mu$l) from each dilution tube as well as from the microcosm itself were spread on petri dishes containing Marine Agar 2216 (Difco). Plates were incubated at room temperature (19° C.) for 5 days, at which time colony-forming unit (CFUs) were enumerated with the aid of a light table and a magnifying lens.

RESULTS

At the beginning of the experiment, there were approximately equal numbers of culturable bacteria in all treatments and controls (Table 1). After application of the described treatment and a 48 hour suffocation period, the number of culturable bacteria had decreased approximately 10-fold, and there was increased variability within and among treatments than before. On Day 8, the controls and the treatments differed markedly. The decline in culturable bacteria continued in Treatments TA, TB, and TC, but counts increased by 2 to 3 orders of magnitude in the controls.

TABLE 1

Number of bacterial colony forming units (CFU) per mL from the current study among the controls and treatments at Day 0, Day 2 and Day 8 (duplicate results are reported). CUF = control, unfiltered; CF = control filtered; TA to TC from least to most aggressive treatments.

TA:2 min., 2 in. Hg vacuum
TB:2 min., 4 in. Hg vacuum
TC:2 min., 6 in. Hg vacuum

|       | CUF       | CF      | TA     | TB     | TC     |
|-------|-----------|---------|--------|--------|--------|
| DAY 0 | 29,000    | 31,000  | 44,700 | 30,600 | 31,300 |
| DAY 1 | 20,000    | 32,700  | 39,800 | 28,400 | 31,600 |
| DAY 2 | 1,540     | 4,370   | 1,680  | 2,640  | 2,580  |
| DAY 2 | 2,110     | 2,880   | 3,840  | 1,640  | 2,590  |
| DAY 8 | 1,064,000 | 692,000 | 229    | 515    | 865    |
| DAY 8 | 4,640,000 | 480,000 | 445    | 523    | 436    |

DISCUSSION

The results of the earlier Solutions Lab study had strongly suggested that the vacuum/agitation treatment was effective in reducing CFU populations under the test conditions. These results are reproduced in Table 2 for comparison to the results from the AMRL/ODU study. Differences between the two studies include: 1) the AMRL/ODU study used duplicates of each treatment for each day in a sacrifice series which reduce the chance for cross contamination of the microcosms; 2) the source of water for the Solutions Lab study appears to have contained a greater concentration of viable bacteria at the initiation of the study; 3) samples for the AMRL/ODU study were agitated by a swirling hand motion and then subjected to two minutes of the relevant vacuum, while the samples used in the Solutions Lab study were vigorously agitated with a handshaking motion for the entire two minutes that the relevant vacuum was applied; 4) the AMRL/ODU study employed a 3-fold dilution series to allow scoring of responses over a greater range of CFUs, and 5) the samples were collected at different times.

TABLE 2

Number of bacterial colony forming units (CFU) per mL among the controls and treatments at Day 0, Day 2 and Day 8 from a previous study. CUF = control, unfiltered; CF = control filtered; TA to TC from least to most aggressive treatments.

|       | CUF     | CF      | TA      | TB      | TC      |
|-------|---------|---------|---------|---------|---------|
| DAY 0 | 250,000 | 250,000 | 250,000 | 250,000 | 250,000 |
| DAY 2 | 225,000 | 150,000 | 120,000 | 100,000 | 75,000  |
| DAY 8 | 150,000 | 100,000 | 80,000  | 20,000  | <2,000  |

The data from the Solutions Lab study (Table 2) suggest an increasing effectiveness with increasing treatment levels. When these data are expressed as percent reduction from the initial conditions (Table 3), the patterns are apparent.

TABLE 3

Results of the AMRL/ODU study are compared to the Solutions Lab study expressed as percent reduction in colony forming units (CFU/mL) from the initial conditions (CFU/mL at Day 0).

SOLUTIONS LAB STUDY

|       | CUF | CF  | 2" Hg TA | 4" Hg TB | 6" Hg TC |
|-------|-----|-----|----------|----------|----------|
| DAY 2 | 10% | 40% | 52%      | 60%      | 70%      |
| DAY 8 | 40% | 60% | 68%      | 92%      | 99%      |

AMRL/ODU STUDY

|       | CUF | CF  | TA  | TB  | TC  |
|-------|-----|-----|-----|-----|-----|
| DAY 2 | 94% | 89% | 91% | 93% | 92% |
| DAY 8 | *   | *   | 99% | 98% | 98% |

NOTE: * = The results demonstrated an unexpected rebound in the bacterial population to 89 times the initial CFUs/mL for the unfiltered control, and 18 times the initial condition for the filtered controls.

The reduction of CFUs in all treated samples exceeded all of the controls, both filtered and unfiltered. This suggests that filtration is helpful, but not definitive. The vacuum/agitation treatments with an appropriate suffocation period, which is a major feature of my invention, resulted in significant reductions in CFU counts. Variations in these reductions was more significant with the increase of the suffocation times chosen for the initial testing than with the chosen vacuum levels. My invention does not propose a limit on vacuum levels, and levels higher than those chosen for these initial tests may show a more significant effect in a shorter time suffocation. These tests do show a clear positive correlation between CFU reductions and either higher vacuum/agitation activity or suffocation times, or both.

At the end of Day 8, all three treatments of the AMRL/ODU study exhibited a reduction in CFUs of approximately 98% from the initial condition. The results of the AMRL study were declared "remarkable" in that they very closely agree with the results of treatment TC (2 minutes/6"Hg) in the previous study of reduction achieved. In the AMRL/ODU study the treatment conditions were held constant over the exposure duration, while in the previous study it is unclear if the treatment conditions were held constant for the same period. It should be noted that if the Day 8 counts were compared to the results of the filtered and unfiltered controls at Day 8, the treatment would appear to be more than 99% effective.

CONCLUSIONS TO STUDIES

The process applied at three vacuum/agitation levels in the studies conducted showed that the art was effective at reducing natural CFU populations from samples collected from the Elizabeth River, Virginia. The various data showed various sensitivities to vacuum/agitation levels and to various suffocation times. Both studies indicated increased reductions of CFU as a positive correlate to higher vacuum levels in the vacuum/agitation stage and longer suffocation times. Presumably, longer periods of time in the vacuum chamber and higher levels of vacuum and/or agitation inherent in the vacuum/agitation treatment would all be positive correlates. Both studies were conducted without any interference on my part with the academic integrity of AMRL/ODU or any interference with the commercial integrity of Solutions Lab and/or the individual conducting the tests.

The AMRL/ODU study confirms the results of the Solutions Lab study where the greatest level of effectiveness was approximately 99% at the highest vacuum/agitation level. This level of effectiveness is surprising and was not expected by the AMRL/ODU investigators (the Director and Assistant Director of AMRL).

The apparent rebound in bacterial populations observed in the AMRL study between Day 2 and Day 8 for the filtered and unfiltered controls was unexpected by the investigators, but significant to the demonstration of the degree of effectiveness of my invention. If the comparison is made between the Day 8 treated samples versus the Day 8 controls, the effectiveness of my process is greater than 99%. The rebound (increase in CFU population) seen in the filtered and unfiltered controls clearly demonstrates that my process has a significant destruction effect on the CFU populations found in the Elizabeth River water sample even when a rebound effect on a massive scale is occurring within the controls. It is unknown if the rebound effect would occur in all cases where ambient or natural water is taken from the worldwide environment; however, the rebounding effect from the Elizabeth River water used in the AMRL/ODU test serves to demonstrate that my invention is effective enough to achieve a high death rate of microorganisms even when they are in an environment conducive to rapid reproduction.

What is claimed is:

1. A process for treating ballast water, in a space defining a hold or ballast tank of a ship, to reduce an initial population of microorganisms in the ballast water, said microorganisms comprising aerobic microorganisms, said process comprising the steps of:
   deoxygenating the ballast water containing the aerobic microorganisms by agitating the ballast water under a vacuum for a first period of time, wherein said deoxygenating step removes dissolved oxygen from the ballast water; and
   after said deoxygenating step, sealing the space containing the treated ballast water for a second period of time until the initial population has been reduced.

2. The process as claimed in claim 1, further comprising the step of sealing the space until a percentage of the initial population that has been killed is at least 50%.

3. The process as claimed in claim 2, wherein said second period of time is approximately two days.

4. The process as claimed in claim 2, further comprising the step of sealing the space until a percentage of the initial population that has been killed is at least 90%.

5. The process as claimed in claim 2, wherein said second period of time is approximately eight days, and wherein said percentage is at least 97%.

6. The process as claimed in claim 5, wherein said percentage is greater than 99%.

7. The process as claimed in claim 6, wherein said first period of time is approximately two minutes.

8. The process as claimed in claim 6, further comprising the step of, after said deoxygenating step, introducing a reducing gas into the ballast water in order to further increase said percentage of the population that will be killed.

9. The process as claimed in claim 8, wherein said reducing gas consists of combustion exhaust gases.

10. The process as claimed in claim 4, wherein said microorganisms also comprise anaerobic microorganisms, said process further comprising the step of, prior to said deoxygenating step, oxygenating the ballast water containing the anaerobic microorganisms so that said anaerobic microorganisms are killed or debilitated to a point where their reproduction rate is substantially reduced even during said second period when said anaerobic microorganisms are in an anaerobic habitat.

11. The process as claimed in claim 10, wherein each of said deoxygenating step and oxygenating step has a duration on the order of seconds and minutes, and wherein said second period of time has a duration on the order of days.

12. The process as claimed in claim 2, further comprising the step of measuring said percentage at the end of said second period of time.

13. The process as claimed in claim 4, further comprising the steps of:
   pumping the ballast water out of the space prior to said deoxygenating step; and
   returning the ballast water to the space after the deoxygenating step.

14. The process as claimed in claim 13, wherein said returning step is performed prior to said sealing step.

15. The process as claimed in claim 13, wherein said returning step is performed after said sealing step.

16. The process as claimed in claim 4, further comprising the steps of:
   pumping the ballast water out of the space prior to said deoxygenating step;
   pumping the water into a treatment tank;
   then subjecting the ballast water in said treatment tank to said agitating step and said vacuum;
   then pumping the treated ballast water back into said space for said second period of time; and
   then determining said percentage of the population that has been killed.

17. A process for treating ballast water, as it is being pumped from ambient water alongside a ship into a space defining a hold or ballast tank of a ship, to reduce an initial population of microorganisms in the ballast water, said microorganisms comprising aerobic microorganisms, said process comprising the steps of:
   pumping the water to create turbulence therein which produces agitation of the water; and
   deoxygenating the pumped ballast water containing the aerobic microorganisms by subjecting the agitated ballast water to a vacuum for a first period of time, wherein said deoxygenating step removes dissolved oxygen from the ballast water; and
   after said deoxygenating step, sealing the space containing the treated ballast water for a second period of time until a percentage of the population that has been killed is at least 50%.

18. The process as claimed in claim 1, wherein the vacuum above the agitated ballast water is 2 to 6 inches of mercury.

19. The process as claimed in claim 18, wherein the vacuum above the agitated ballast water is 2 to 4 inches of mercury.

20. The process as claimed in claim 1, wherein said sealing step makes the space at least weathertight.

21. The process as claimed in claim 1, further comprising covering an exposed surface of the treated ballast water with a barrier that is substantially impervious to oxygen $O_2$.

22. The process as claimed in claim 21, wherein said barrier is a blanket of gas having an oxygen $O_2$ content of 10% or less by volume to prevent reoxygenation of the treated ballast water.

23. The process as claimed in claim 22, wherein said gas is exhaust gas from an internal combustion engine.

24. An apparatus for treating ballast water, in a space defining a hold or a ballast tank of a ship, to reduce an initial population of microorganisms in the ballast water, said microorganisms comprising aerobic microorganisms, said apparatus comprising:

means for deoxygenating the ballast water containing the aerobic microorganisms by agitating the ballast water under a vacuum for a first period of time, thereby to remove dissolved oxygen from the ballast water; and means for sealing the space containing the treated ballast water for a second period of time until the initial population has been reduced, wherein said sealing means seals the space until a percentage of the initial population that has been killed is at least 90%, wherein the ballast water also contains anaerobic microorganisms, wherein the ballast water flows in a direction from said deoxygenating means toward said space; and further comprising means, positioned upstream from said deoxygenating means, for oxygenating the ballast water to kill the anaerobic microorganisms or to debilitate them to a point where their reproduction rate is substantially reduced even during said second period when the habitat of said anaerobic microorganisms is anaerobic.

25. The apparatus as claimed in claim 24, further comprising means, located upstream from said oxygenating means, for filtering out from the ballast water any macroorganisms contained therein.

26. The apparatus as claimed in claim 25, further comprising means, pre-existing onboard the ship, for pumping ballast water from the space, through the deoxygenating means, and then back to the space.

27. The apparatus as claimed in claim 26, wherein said pumping means agitates the water.

28. The apparatus as claimed in claim 25, further comprising:

a first treatment tank connected to said oxygenating means; and a second treatment tank connected to said deoxygenating means, wherein said filtering means, said first treatment tank, said oxygenating means, said second treatment tank and said deoxygenating means are assembled as a portable unit adapted to be installed on the ship for treating the ballast water.

* * * * *